(12) United States Patent
Lagares Corominas (10) Patent No.: US 8,336,452 B2
(45) Date of Patent: Dec. 25, 2012

(54) MACHINE FOR INJECTING FLUIDS INTO MEAT OR FISH PRODUCTS

(75) Inventor: Narcis Lagares Corominas, Girona (ES)

(73) Assignee: Metalquimia, S.A., Girona (ES)

( * ) Notice: Subject to any disclaimer, the term of this patent is extended or adjusted under 35 U.S.C. 154(b) by 531 days.

(21) Appl. No.: 12/598,836

(22) PCT Filed: Apr. 9, 2008

(86) PCT No.: PCT/ES2008/000216
§ 371 (c)(1),
(2), (4) Date: Jan. 26, 2010

(87) PCT Pub. No.: WO2008/135610
PCT Pub. Date: Nov. 13, 2008

(65) Prior Publication Data
US 2010/0147162 A1      Jun. 17, 2010

(30) Foreign Application Priority Data
May 4, 2007    (ES) .................................. 200701266

(51) Int. Cl.
*A23L 1/31*    (2006.01)
*A23L 1/00*    (2006.01)
(52) U.S. Cl. ............................. 99/533; 99/532; 99/487
(58) Field of Classification Search ............ 99/485–487, 99/494, 516, 532–536; 426/231, 281, 332, 426/442, 541, 641, 650, 652
See application file for complete search history.

(56) References Cited

U.S. PATENT DOCUMENTS

| | | | |
|---|---|---|---|
| 4,254,151 A * | 3/1981 | Townsend | 426/231 |
| 4,437,397 A * | 3/1984 | Kawai | 99/533 |
| 4,690,046 A * | 9/1987 | Corominas | 99/533 |
| 5,664,488 A * | 9/1997 | Smith | 99/487 |
| 5,773,060 A * | 6/1998 | Smith | 426/281 |
| 5,913,968 A | 6/1999 | Thomas | |
| 6,901,850 B2 | 6/2005 | Corominas | |

(Continued)

FOREIGN PATENT DOCUMENTS

EP        1 607 001 A1    12/2005

(Continued)

OTHER PUBLICATIONS

International Search Report for PCT International Application No. PCT/ES2008/000216 mailed Jul. 15, 2008.

*Primary Examiner* — Kien Nguyen
(74) *Attorney, Agent, or Firm* — RatnerPrestia (57) ABSTRACT

A machine for injecting fluids into meat or fish products includes an injection head with parallel hollow needles that can be retracted by a contrast elastic device, provided to be lifted and lowered in relation to a conveyor for conveying products, each needle having an inlet opening leading into its cannula that can be located in a pressurized fluid injection chamber having a fluid inlet, the chamber being formed by a block with longitudinal ducts interconnected by ducts and a plurality of transverse ducts for the passage of the needles intersecting the longitudinal ducts, each duct including sleeves provided with seals, the block being detachable from a housing for the head and fixed by oscillating plates, one for guiding the needles and the other carrying a plurality of cylinders supplying the contrast elastic device.

10 Claims, 10 Drawing Sheets

U.S. PATENT DOCUMENTS 7,886,659 B2 * 2/2011 Lagares Corominas ........ 99/532

FOREIGN PATENT DOCUMENTS

| | | |
|---|---|---|
| ES | 8600876 | 2/1986 |
| ES | 2 103 338 | 9/1997 |
| ES | 2 252 565 | 5/2006 |
| GB | 706437 | 3/1954 |
| GB | 862307 | 3/1961 |
| WO | WO 83/02547 | 8/1983 |
| WO | WO 02/094028 A1 | 11/2002 |

* cited by examiner

MACHINE FOR INJECTING FLUIDS INTO MEAT OR FISH PRODUCTS

This application is a U.S. National Phase Application of PCT International Application No. PCT/ES2008/000216, filed Apr. 9, 2008.

TECHNICAL FIELD

The present invention relates to a machine provided for injecting treatment fluids, especially brine, in meat products, with one or more injection heads, each head integrating a plurality of parallel hollow needles that can be retracted by contrast elastic means opposite to the ends of each needle far from the tip thereof, said head being provided for being moved in a vertical lifting and lowering double travel motion in relation to the plane of a conveyor for conveying pieces of meat, forwarding step by step, each needle having an inlet opening leading into its cannula, that is capable of being located in a pressurized fluid injection chamber connected to means for supplying said fluid.

The machine of this invention is likewise applicable to food products from the fish industry or the like.

BACKGROUND OF THE INVENTION

Figure 1:
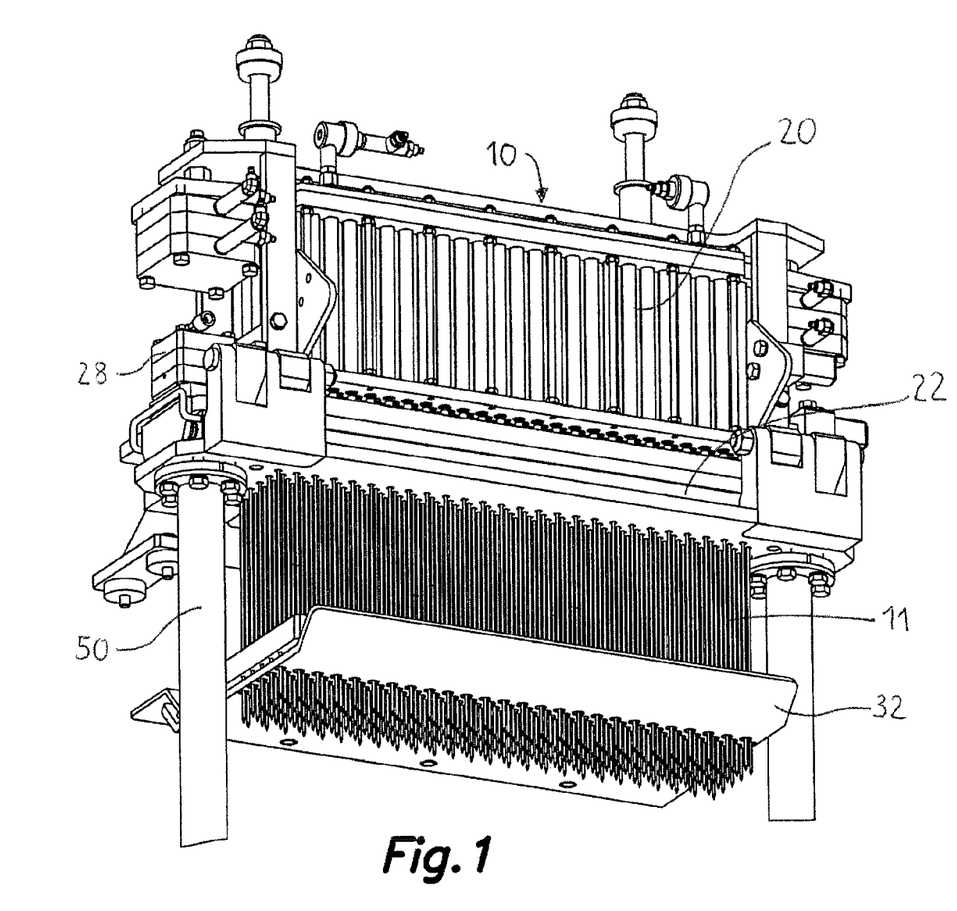
FIG. 1 shows a perspective view of the proposed head depicting the columns for its movement in a vertical lifting and lowering double travel motion.
Figure 2:
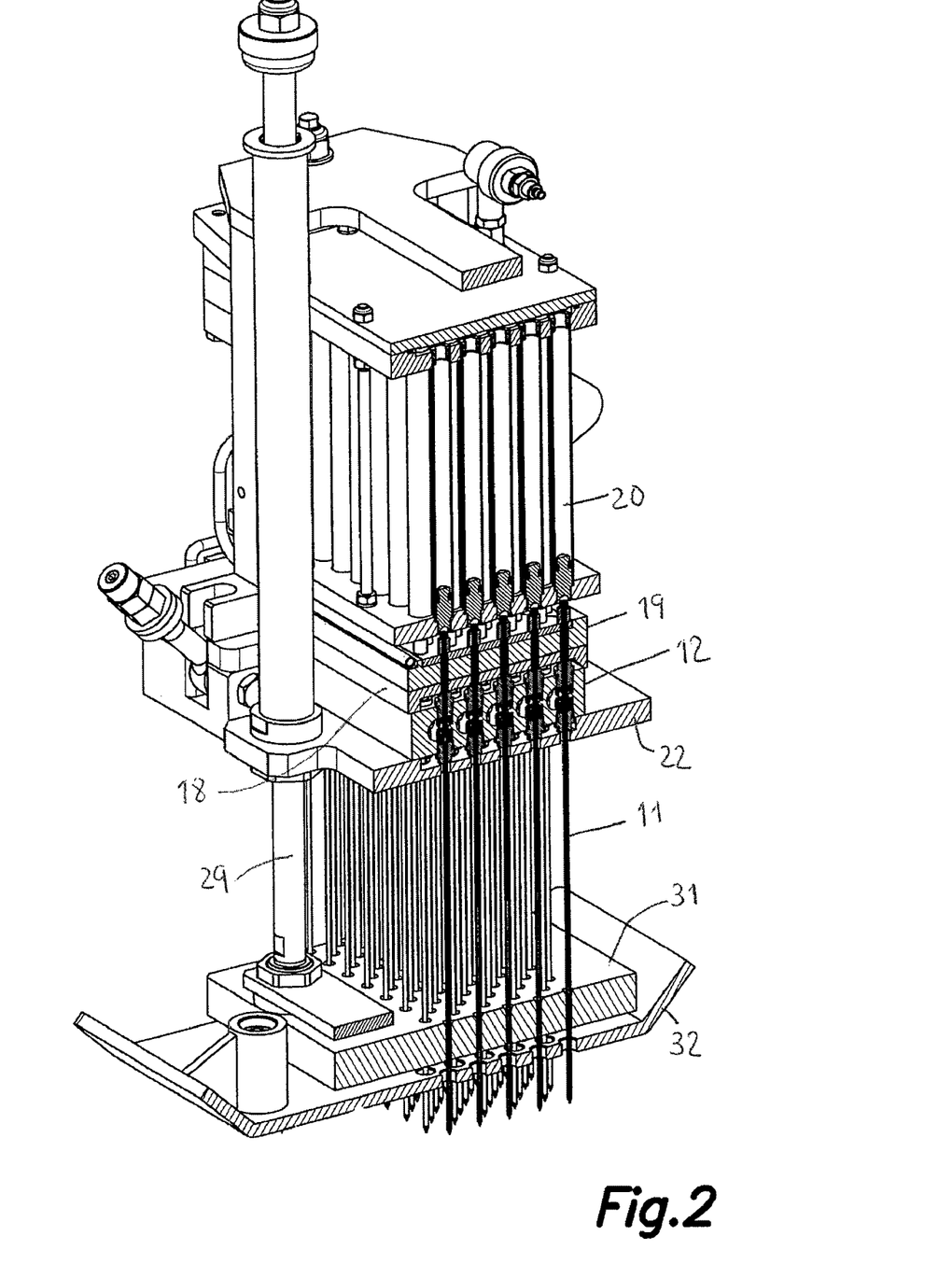
FIG. 2 shows a partial perspective view of the injection head of the machine of the invention.
Figure 3A:
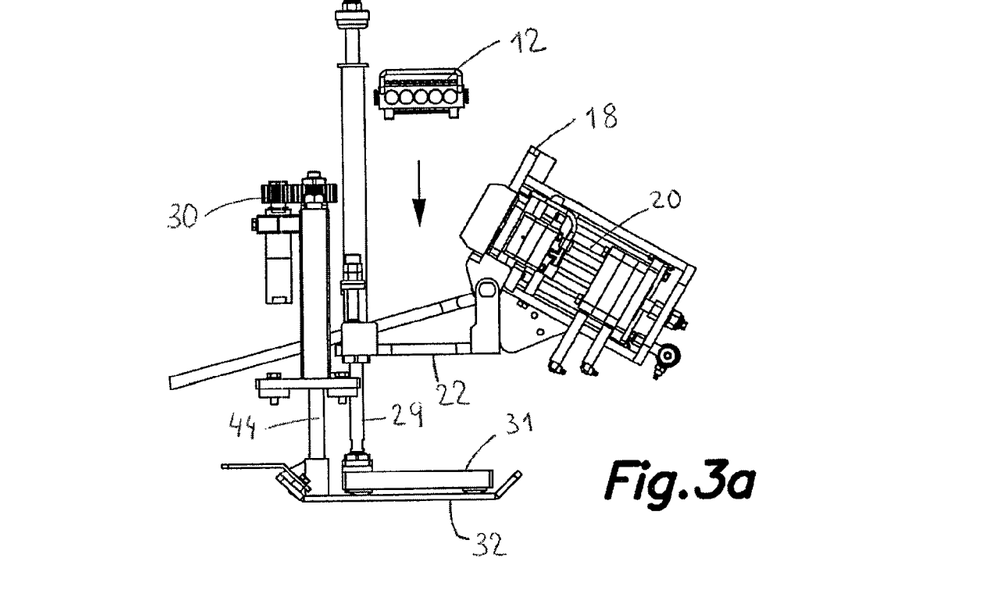
FIGS. 3a to 3e show side views of the injection head of the machine of this invention, showing the different phases of assembly of the injection chamber in the mentioned platform, as well as the installation of the needles and the final arrangement of the assembly, ready for operation (FIG. 3e).
Figure 3B:
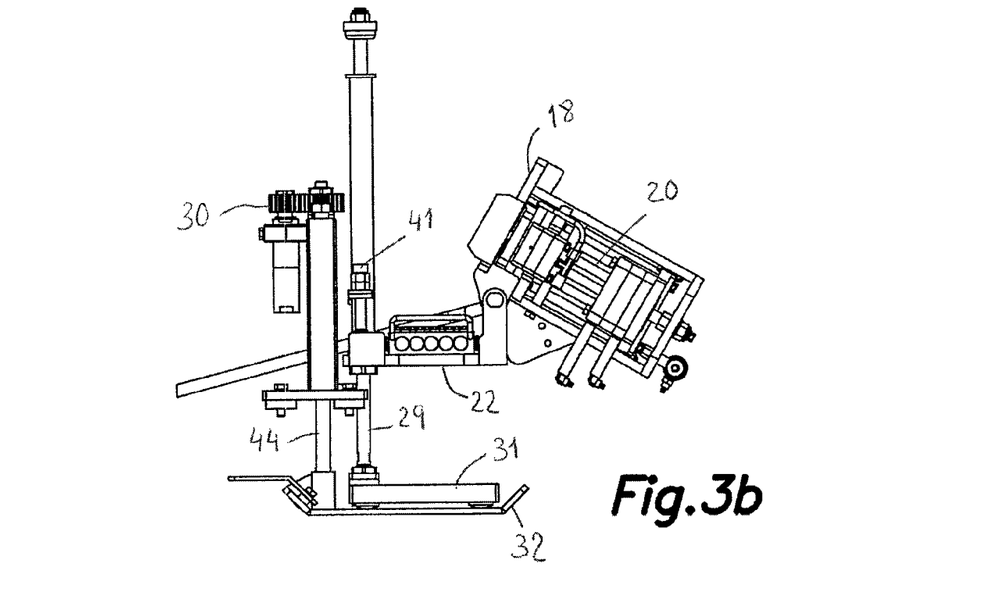
Figure 3C:
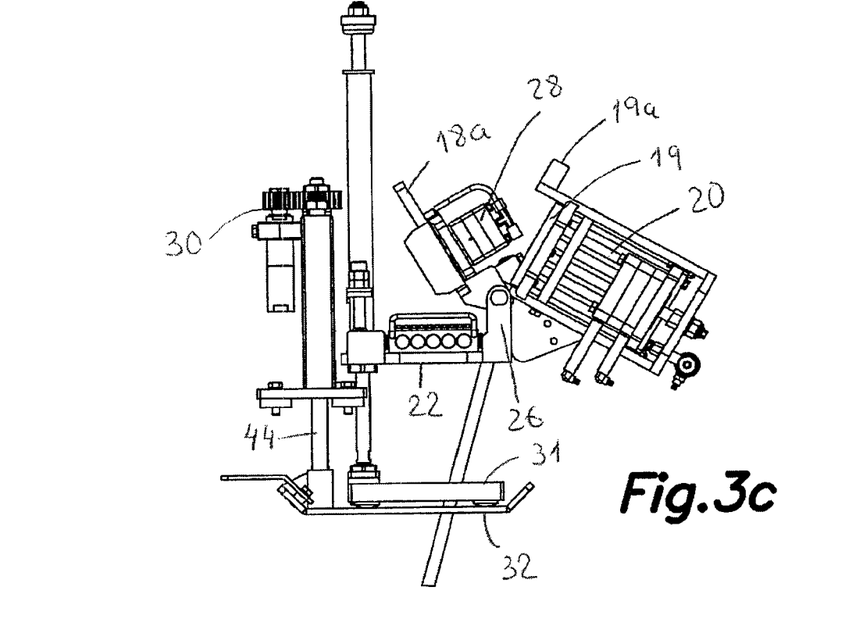
Figure 3D:
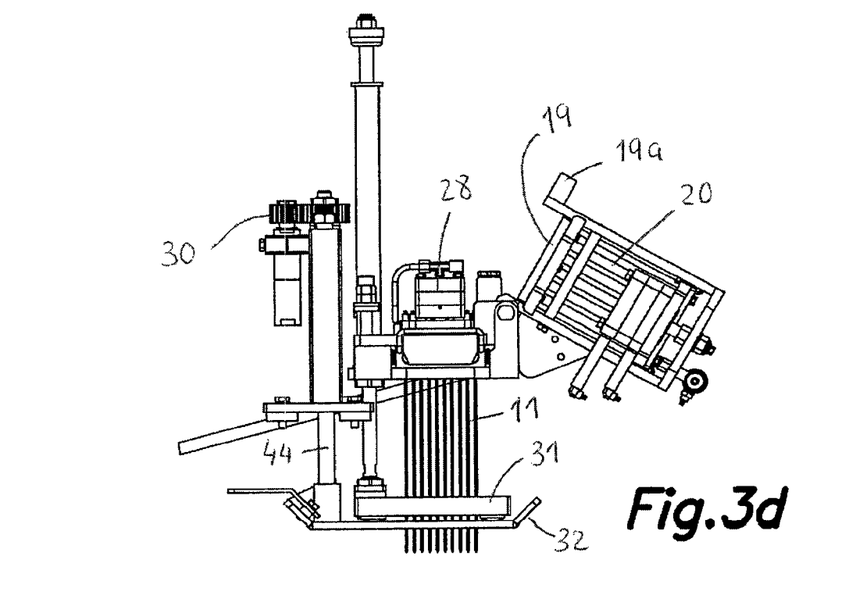
Figure 3E:
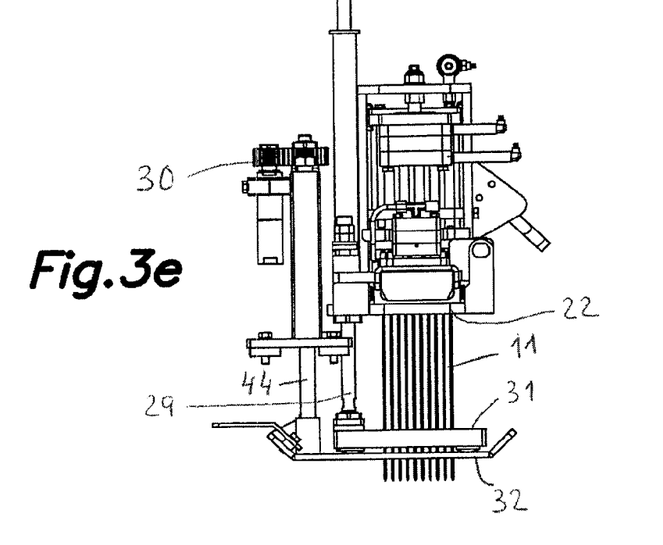
Figure 4:
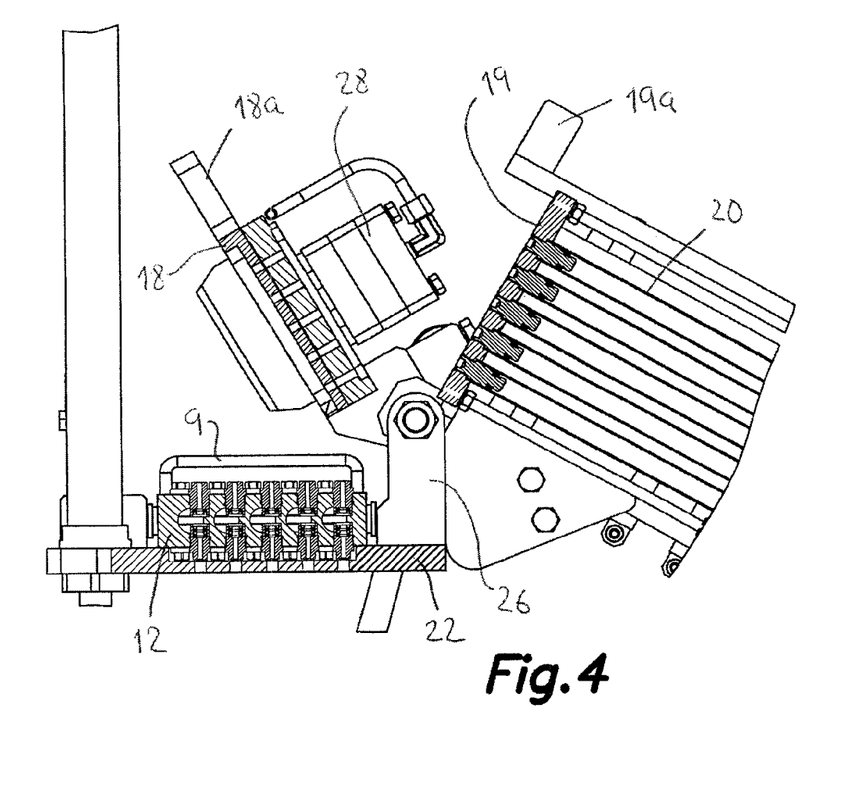
FIG. 4 shows a partial enlarged view of FIG. 3c, with additional section of some of the integrating elements for better comprehension of the proposed technical solution.

U.S. Pat. No. 6,901,850, belonging to the same inventor as the present invention, discloses a machine with these features, in which there is described a prismatic block internally defining a chamber distributing the fluid to be injected and which is formed by a plurality of upright cylindrical through ducts, arranged equidistant and distributed according to several rows parallel to one another (see FIG. 4).

Patent application WO-83/02547 and patent EP-B1-1607001 likewise describe machines with the mentioned general features.

In all the cases the maintenance tasks for the injection chamber, particularly the assembly and disassembly thereof, to assure the leak-tightness of the unit, as well as the cleaning tasks are very expensive due to the difficulty and labor time involved.

BRIEF DESCRIPTION OF THE INVENTION

The present invention contributes to avoiding the mentioned drawbacks by means of providing a unique injection chamber structure, which comprises an assembly suitable for being separated from the site it occupies to carry out said maintenance tasks, furthermore being easy to assemble by means of oscillating plates.

According to this invention the mentioned injection chamber having a pressurized fluid feeding inlet is formed by a block with several longitudinal ducts interconnected by perpendicular ducts and a plurality of transverse ducts for the passage of the needles intersecting the longitudinal ducts, each transverse duct for the passage of the needles comprising, in its two mouths, sleeves provided with seals or other equivalent leak-tightness means. Such a construction allows an improved handling of the injection chamber with easy cleaning and inspection.

The mentioned block can be detached in relation to a platform of the head defining a housing and fixed by a first oscillating plate for guiding and supporting the needles and at least by a second oscillating plate, carrying a plurality of cylinders providing said contrast elastic means.

The two mentioned oscillating plates are arranged overlapping the block forming the injection chamber, fixed to the mentioned platform of the head by fastening means such as articulated bolts and nuts which are coupled to outwardly projecting appendages of the plates.

Other features of the invention will be shown more clearly in the following description relating to embodiments given as merely illustrative and non-limiting examples.

BRIEF DESCRIPTION OF THE DRAWINGS

Finally FIG. 10 schematically shows the device for detecting the thickness of the pieces of meat to be injected and conveniently positioning a slab to assist the extraction of the needles from the injected product.

DETAILED DESCRIPTION OF EXEMPLARY EMBODIMENTS

The machine for injecting fluids into meat or fish products of the invention comprises one or more injection heads 10, each of them carrying a plurality of parallel hollow needles 11 that can be retracted by contrast elastic means opposite to the ends of each needle far from the tip thereof, said head being provided for being moved in a lifting and lowering double travel motion, by (generally hydraulic) drive means in relation to the plane of a conveyor 21 (see FIG. 10) for conveying pieces of meat, each needle 11 having an inlet opening 11a (see FIG. 9) leading into its cannula that can be arranged in a pressurized fluid injection chamber connected to means for supplying said fluid from at least one source, all of them according to conventional technique in the sector.

Figure 5:
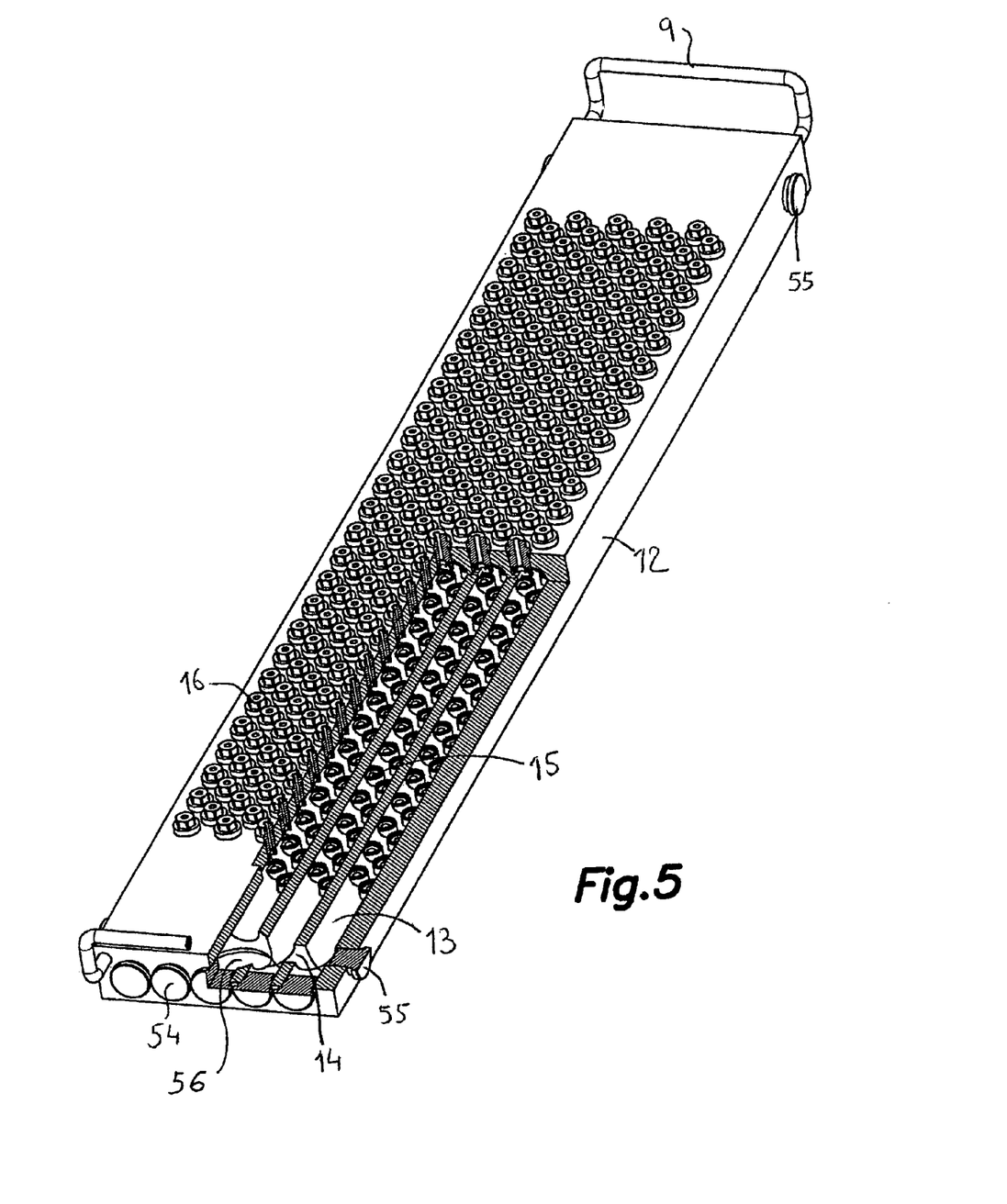
FIG. 5 shows a partial cross section and perspective view of the block forming the injection chamber.
Figure 9:
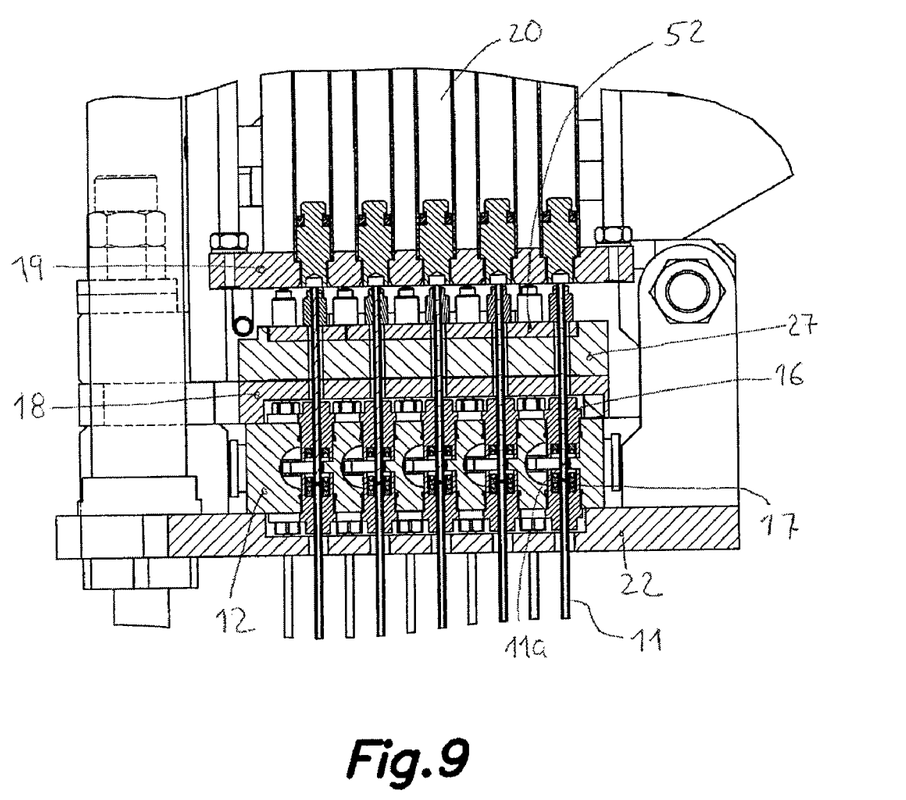
FIG. 9 shows a sectioned partial side view of the head depicting the operating arrangement of the block forming the injection chamber and of the oscillating plates and of plates for the selective lifting motion of the needles, for the detachable fixing of said block.

The invention proposes that the mentioned injection chamber, which is provided with a fluid inlet for the fluid to be injected, is formed by a block 12 with several longitudinal ducts 13 interconnected by ducts 14 and a plurality of transverse ducts 15 for the passage of the needles 11 intersecting the longitudinal ducts 13, each transverse duct 15 comprising in its mouths sleeves 16 provided with seals 17 (see FIGS. 5 and 9). This block 12 is arranged in detachable configuration in relation to a platform 22 of the head (connected to the mentioned vertical double travel lifting means) defining a housing and the block 12 is fixed by a first oscillating plate 18 for guiding and supporting the needles and at least by a second oscillating plate 19, carrying a plurality of cylinders 20 providing said contrast elastic means, said plates 18 and 19, in a situation overlapping the block 12, being articulated to the mentioned platform 22 of the head 10 through arms 26 and fixed to the mentioned platform 22 of the head by fastening means 40, 41.

As shown in FIGS. 3a to 3e, such an arrangement allows the assembly of the block 12 in a detachable manner only by raising the oscillating plates 18, and 19, and at the same time a very firm fastening of the block to the platform is obtained when said two plates 18, 19 are lowered and fixed. To that end said plates 18, 19 are provided with appendages 18a, 19a with a passageway for bolts 40 to be fastened to the platform 22 by means of nuts 41.

The block 12 incorporates handles 9 at its two ends to facilitate the handling thereof.

FIG. 5 shows that the longitudinal ducts 13 and transverse ducts 14 are provided with plugs 54, 55, for inspection and cleaning of said ducts, the opening 56 for access of fluid to be injected into said block 12 likewise being seen.

The platform 22 is connected to means (e.g., hydraulic means) for lifting and lowering along upright columns 50 in relation to the mentioned plane of a conveyor 21 provided for step by step conveying meat pieces.

The plate 18 for guiding and supporting the needles 11 integrates on its outer needle retaining face an auxiliary plate 27 with a plurality of openings for the passage of the needles, the thickened heads of which are supported against the outer surface of said auxiliary plate 27, this plate 27 being connected at its ends to lifting and lowering means for jointly lifting the needles a predetermined travel in relation to the injection chamber 12 so that the inlet opening 11a is located at the intermediate point between the seals 17 and thereby in contact with the injection chamber 12, to perform a controlled continuous injection through the mentioned needles 11.

According to a preferred embodiment, said means for lifting and lowering the plate 27 consist of pneumatic cylinders 28 installed at two end portions of the plate 18.

Other plates 52 carrying groups of needles, which can be associated with a handle 53 for the handling thereof are further arranged on top of said plate 27, which plates 52 are housed in a recessed part of said plate 27.

As shown in the figures, associated with the head that is being described there is provided a slab 32 of height adjustable by adjusting means 30 (e.g., a motor-reducer unit) along a column 44. This slab 32, located at a prefixed height, contributes to pull out the needles upon lifting the head and with it the needles 11.

The head further integrates a hold-down plate 31 with a plurality of openings for the passage of the needles, connected by elastic means to support columns 29 lowering said hold-down plate 31 on the mentioned slab 32.

Figure 10:
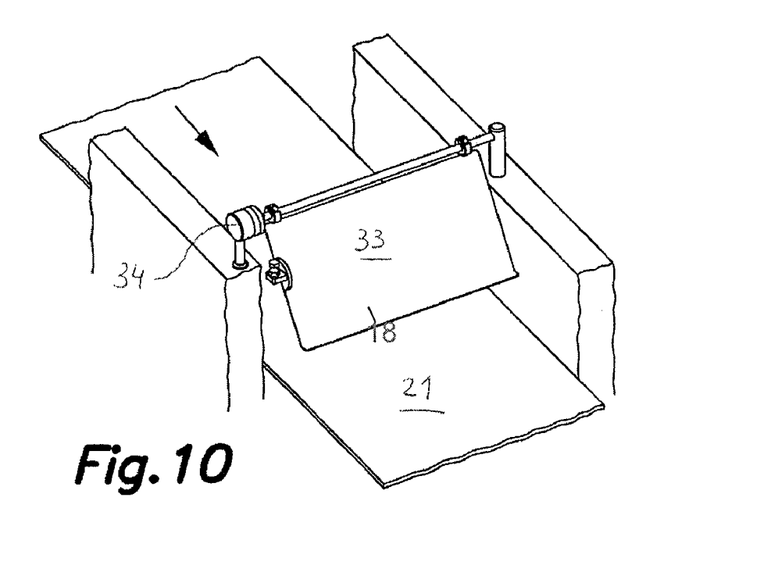

FIG. 10 depicts means for detecting the thickness of the pieces of meat to be injected, comprising a flap door 33 connected to a shaft suspended with a possibility to rotate and a device 34 for detecting the angular rotation, so that when the pieces of fish or meat move forward on the conveyor 21, they move said flap door to a greater or lesser extent, providing the device 34 with information about the position in which to place the slab 32, cooperating in removing the needles 11 from the injected product.

Figure 6:
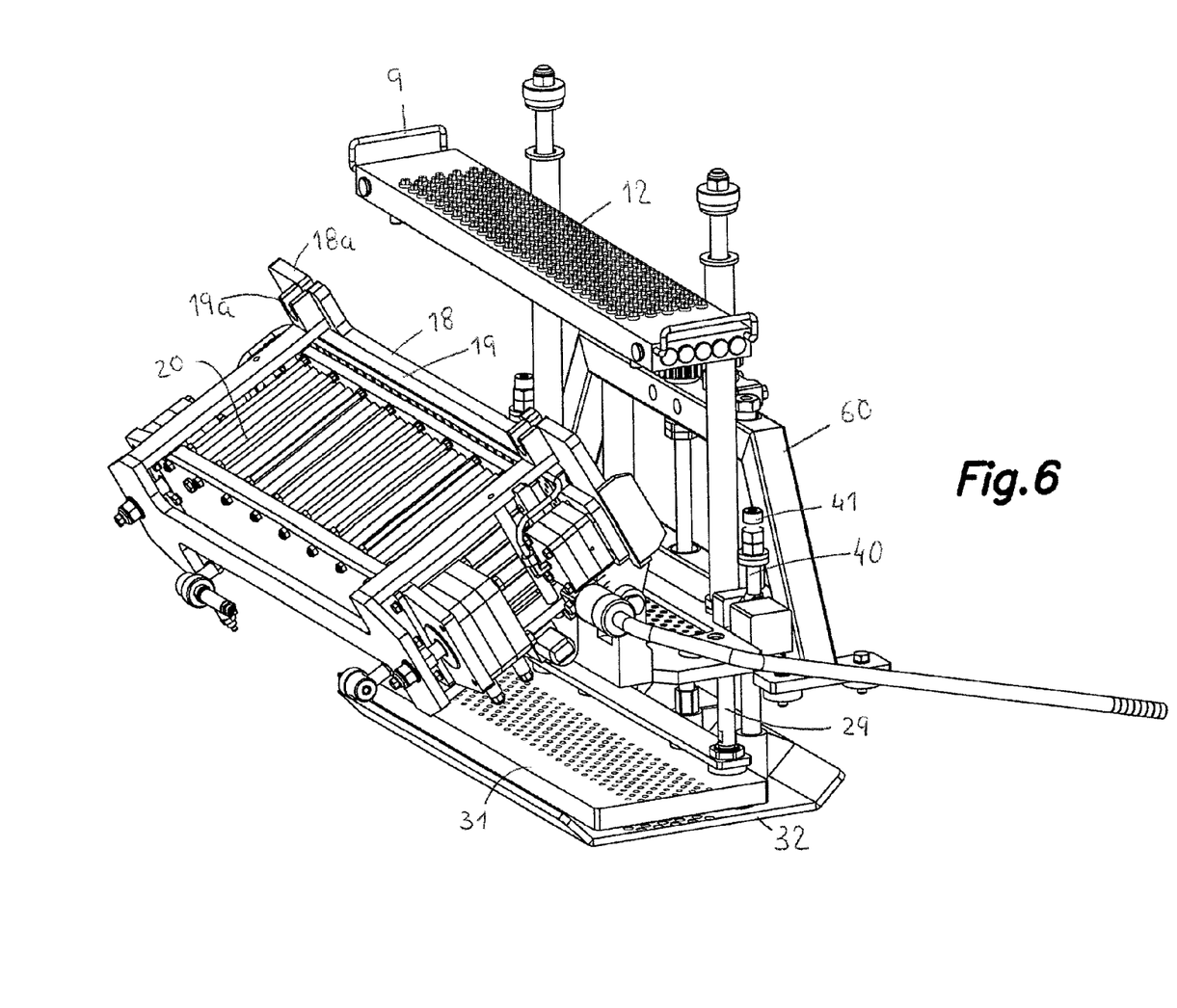
FIGS. 6 and 7 show perspective views of the injection head portion of the invention, the plate forming the injection chamber being depicted separated from its assembly configuration in the head and a group of needles arranged on one of the oscillating plates fixing the injection chamber.
Figure 7:
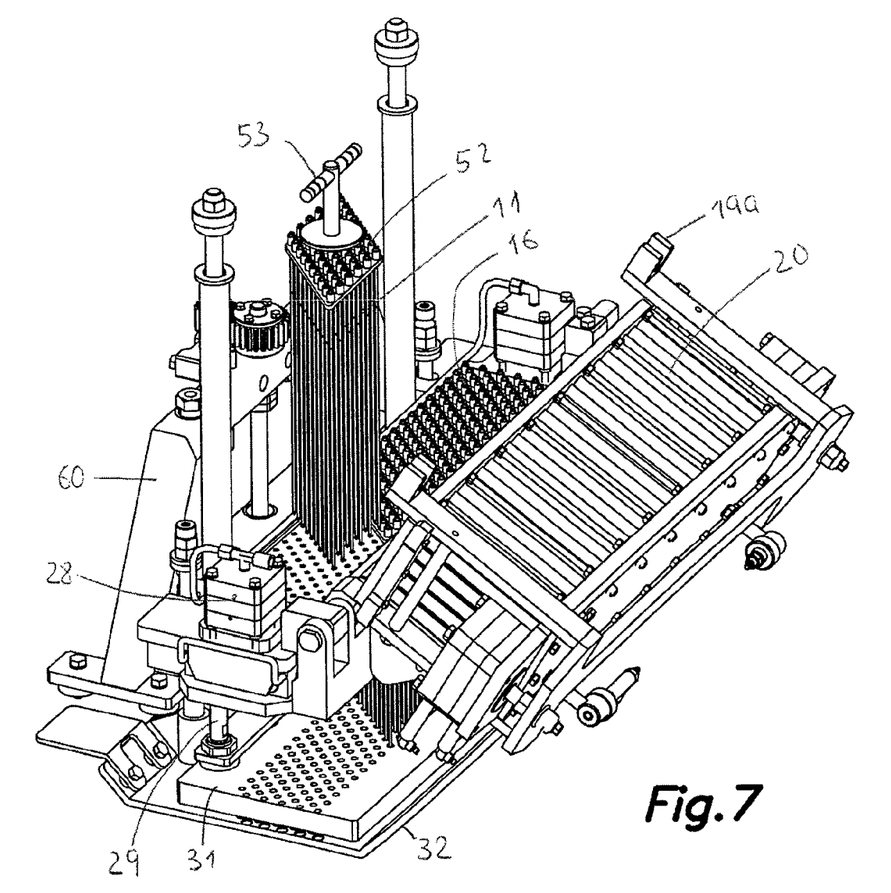
Figure 8:
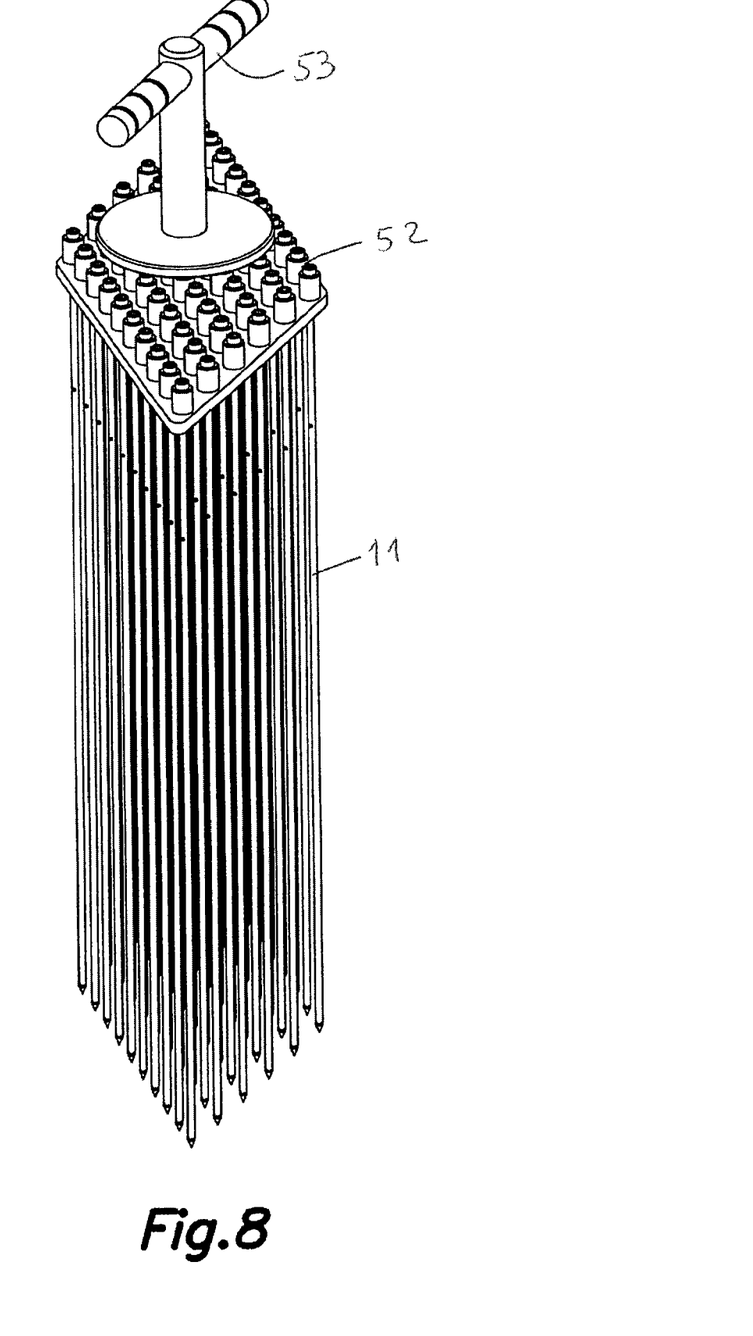
FIG. 8 shows a perspective view showing a group of needles in an embodiment of the invention.

FIGS. 6 and 7 partially depict the bridge 60 fixed to the bed of the machine and connected to the head 10.

Having sufficiently described the machine object of the invention so as to be able to be put it into practice, the description provided extends to those variations in detail (drive means), the structural configuration of the assembly, etc., which do not alter its essential nature as it is described in the following claims.

The invention claimed is:

1. A machine for injecting fluids into meat or fish products, said machine having at least one injection head comprising a pressurized fluid injection chamber connected to means for supplying fluid from at least one source and a plurality of parallel hollow needles that can be retracted by contrast elastic means opposite to the ends of each needle far from the tip thereof, each needle having an inlet opening leading into its cannula that is capable of being located in said pressurized fluid injection chamber, said head being arranged to be moved in a lifting and lowering double travel motion in relation to a plane of a conveyor conveying pieces of meat or fish, wherein said chamber, which is provided with a fluid inlet for fluid to be injected, is formed by a block with several longitudinal ducts interconnected by further ducts and a plurality of transverse ducts for the passage of the needles intersecting the longitudinal ducts, each transverse duct comprising in its mouths sleeves provided with seals, said block being detachable in relation to a platform of the head defining a housing and the block being fixed by a first oscillating plate for guiding and supporting the needles and at least by a second oscillating plate carrying a plurality of cylinders providing said contrast elastic means, said first and second oscillating plates, in a situation overlapping the block, being fixed to the platform of the head by fastening means.

2. The machine according to claim 1, wherein said first and second oscillating plates are articulated to the platform of the head through arms.

3. The machine according to claim 1, wherein the platform is connected to means for lifting and lowering along upright columns, in relation to the plane of said conveyor for step by step conveying of the pieces of meat.

4. The machine according to claim 1, wherein the first oscillating plate for guiding and supporting the needles has on its outer needle retaining face an auxiliary plate with a plurality of openings for the passage of the needles, the thickened heads of which are supported against the outer surface of said auxiliary plate, this auxiliary plate being connected at its ends to lifting and lowering means for jointly lifting the needles a predetermined travel in relation to the injection chamber so that the opening is located at the intermediate point between said seals and thereby in contact with the injection chamber to perform a controlled continuous injection through the needles.

5. The machine according to claim 4, wherein said means for lifting and lowering the auxiliary plate comprises pneumatic cylinders installed at two end portions of the plate.

6. The machine according to claim 1, wherein said first and second oscillating plates are provided with appendages with a passageway for bolts to be fastened to the platform by means of nuts.

7. The machine according to claim 1, wherein the block incorporates handles at its two ends to facilitate the handling thereof.

8. The machine according to claim 1, further comprising a slab of adjustable height by an adjusting means along a column.

9. The machine according to claim 1, further comprising means for detecting the thickness of the pieces of meat to be injected, comprising a flap door connected to a shaft suspended with a possibility to rotate and a device for detecting the angular rotation, so that when the pieces of fish or meat move forward on the conveyor, they move said flap door to a greater or lesser extent, providing the device with information about the position in which to place the slab, cooperating in removing the needles from the injected product.

10. The machine according to claim 9, further comprising a hold-down plate with a plurality of openings for the passage of the needles, connected by elastic means to support columns lowering said hold-down plate on the slab.

* * * * *